(12) United States Patent
Bellaton et al.

(10) Patent No.: US 7,016,945 B2
(45) Date of Patent: Mar. 21, 2006

(54) ENTRY DISTRIBUTION IN A DIRECTORY SERVER

(75) Inventors: Gilles Bellaton, St. Martin d'Heres (FR); Sylvain Duloutre, Fontaine (FR); Mark C. Smith, Saline, MI (US)

(73) Assignee: Sun Microsystems, Inc., Santa Clara, CA (US)

( * ) Notice: Subject to any disclaimer, the term of this patent is extended or adjusted under 35 U.S.C. 154(b) by 903 days.

(21) Appl. No.: 09/844,020

(22) Filed: Apr. 27, 2001

(65) Prior Publication Data

US 2002/0162020 A1   Oct. 31, 2002

(51) Int. Cl.
*G06F 15/16* (2006.01)
*G06F 17/30* (2006.01)

(52) U.S. Cl. .................. 709/219; 709/229; 707/3; 707/10

(58) Field of Classification Search ............... 709/217, 709/218, 219, 229; 707/3, 10
See application file for complete search history.

(56) References Cited

U.S. PATENT DOCUMENTS

| | | | |
|---|---|---|---|
| 5,758,343 A * | 5/1998 | Vigil et al. ............... 707/10 |
| 5,774,552 A | 6/1998 | Grimmer ................... 380/25 |
| 6,052,681 A * | 4/2000 | Harvey ...................... 707/3 |
| 6,085,188 A | 7/2000 | Bachmann et al. .......... 707/3 |
| 6,157,942 A | 12/2000 | Chu et al. ................ 709/203 |
| 6,167,449 A * | 12/2000 | Arnold et al. .......... 707/104.1 |
| 6,209,036 B1 * | 3/2001 | Aldred et al. ............ 709/229 |
| 6,408,306 B1 * | 6/2002 | Byrne et al. .......... 707/104.1 |
| 6,609,121 B1 * | 8/2003 | Ambrosini et al. ......... 707/3 |
| 6,633,872 B1 * | 10/2003 | Ambrosini et al. ......... 707/9 |

OTHER PUBLICATIONS

Administrator's Guide Netscape Directory Server Version 4.1, "Chapter 9, Managing Directory Entries", 34 pages.

* cited by examiner

*Primary Examiner*—Patrice Winder
(74) *Attorney, Agent, or Firm*—Osha Liang LLP

(57) ABSTRACT

A method of entry distribution includes receiving requests by a chaining backend from an original client, forwarding requests from the chaining backend to a one of a plurality of remote servers, and returning results from the one of the plurality of remote servers to the original client. The chaining backend is a type of database plug-in that acts as a multiplexer including a directory information tree that provides the hierarchy of the plurality of remote servers.

29 Claims, 12 Drawing Sheets

| Open Digital Marketplaces/Applications 40 |

| Portal Services 42 | | | | |
|---|---|---|---|---|
| Knowledge Management 50 | Security 52 | Personalization 54 | Aggregation 56 | Presentation 58 |

| Communication Services 44 | | | | |
|---|---|---|---|---|
| Web Mail 60 | Calendar 62 | Wireless 64 | Instant Messaging 66 | Unified Messaging 68 |

| Web, Application, and Integration Services 46 | | | | |
|---|---|---|---|---|
| Web Server 70 | Application Server 72 | B2B Integration 74 | EAI Integration 76 | Business Process Automation 78 |

| Unified User Management Services 48 | | | | |
|---|---|---|---|---|
| Directory Server 80 | Meta Directory 82 | Delegated Administration 84 | PKI 86 | Policy 88 |

Internet Service Deployment Platform

| Operating System 30 |

| Network & Systems Infrastructure 32 |

*(PRIOR ART)*
*FIGURE 2*

Entry 124

Attribute Types 120 | Attribute Values 122

| | |
|---|---|
| cn: | Barbara Jensen<br>Babs Jensen |
| sn: | Jensen |
| telephonenumber: | +1 408 555 1212 |
| mail: | babs@airius.com |

*(PRIOR ART)*
*FIGURE 6*

ENTRY DISTRIBUTION IN A DIRECTORY SERVER

BACKGROUND OF INVENTION

The most fundamental program resident on any computer is the operating system (OS). Various operating systems exist in the market place, including Solaris™ from Sun Microsystems Inc., Palo Alto, Calif. (Sun Microsystems), MacOS from Apple Computer, Inc., Cupertino, Calif., Windows® 95/98 and Windows NT®, from Microsoft Corporation, Redmond, Wash., UNIX, and Linux. The combination of an OS and its underlying hardware is referred to herein as a "traditional platform". Prior to the popularity of the Internet, software developers wrote programs specifically designed for individual traditional platforms with a single set of system calls and, later, application program interfaces (APIs). Thus, a program written for one platform could not be run on another. However, the advent of the Internet made cross-platform compatibility a necessity and a broader definition of a platform has emerged. Today, the original definition of a traditional platform (OS/hardware) dwells at the lower layers of what is commonly termed a "stack," referring to the successive layers of software required to operate in the environment presented by the Internet and World Wide Web.

Prior art FIG. 1 illustrates a conceptual arrangement wherein a first computer (2) running the Solaris™ platform and a second computer (4) running the Windows® 98 platform are connected to a server (8) via the Internet (6). A resource provider using the server (8) might be any type of business, governmental, or educational institution. The resource provider (8) needs to be able to provide its resources to both the user of the Solaris™ platform and the user of the Windows® 98 platform, but does not have the luxury of being able to custom design its content for the individual traditional platforms.

Effective programming at the application level requires the platform concept to be extended all the way up the stack, including all the new elements introduced by the Internet. Such an extension allows application programmers to operate in a stable, consistent environment.

iPlanet™ E-commerce Solutions, a Sun Microsystems|Netscape Alliance, has developed a net-enabling platform shown in FIG. 2 called the Internet Service Deployment Platform (ISDP) (28). ISDP (28) gives businesses a very broad, evolving, and standards-based foundation upon which to build an e-enabled solution.

ISDP (28) incorporates all the elements of the Internet portion of the stack and joins the elements seamlessly with traditional platforms at the lower levels. ISDP (28) sits on top of traditional operating systems (30) and infrastructures (32). This arrangement allows enterprises and service providers to deploy next generation platforms while preserving "legacy-system" investments, such as a mainframe computer or any other computer equipment that is selected to remain in use after new systems are installed.

ISDP (28) includes multiple, integrated layers of software that provide a full set of services supporting application development, e.g., business-to-business exchanges, communications and entertainment vehicles, and retail Web sites. In addition, ISDP (28) is a platform that employs open standards at every level of integration enabling customers to mix and match components. ISDP (28) components are designed to be integrated and optimized to reflect a specific business need. There is no requirement that all solutions within the ISDP (28) are employed, or any one or more is exclusively employed.

In a more detailed review of ISDP (28) shown in FIG. 2, the iPlanet™ deployment platform consists of the several layers. Graphically, the uppermost layer of ISDP (28) starts below the Open Digital Marketplace/Application strata (40).

The uppermost layer of ISDP (28) is a Portal Services Layer (42) that provides the basic user point of contact, and is supported by integration solution modules such as knowledge management (50), personalization (52), presentation (54), security (56), and aggregation (58).

Next, a layer of specialized Communication Services (44) handles functions such as unified messaging (68), instant messaging (66), web mail (60), calendar scheduling (62), and wireless access interfacing (64).

A layer called Web, Application, and Integration Services (46) follows. This layer has different server types to handle the mechanics of user interactions, and includes application and Web servers. Specifically, iPlanet™ offers the iPlanet™ Application Server (72), Web Server (70), Process Manager (78), Enterprise Application and Integration (EAI) (76), and Integrated Development Environment (IDE) tools (74).

Below the server strata, an additional layer called Unified User Management Services (48) is dedicated to issues surrounding management of user populations, including Directory Server (80), Meta-directory (82), delegated administration (84), Public Key Infrastructure (PKI) (86), and other administrative/access policies (88). The Unified User Management Services layer (48) provides a single solution to centrally manage user account information in extranet and e-commerce applications. The core of this layer is iPlanet™ Directory Server (80), a Lightweight Directory Access Protocol (LDAP)-based solution that can handle more than 5,000 queries per second.

iPlanet™ Directory Server (iDS) provides a centralized directory service for an intranet or extranet while integrating with existing systems. The term directory service refers to a collection of software, hardware, and processes that store information and make the information available to users. The directory service generally includes at least one instance of the iDS and one or more directory client programs. Client programs can access names, phone numbers, addresses, and other data stored in the directory.

One common directory service is a Domain Name System (DNS) server. The DNS server maps computer host names to IP addresses. Thus, all of the computing resources (hosts) become clients of the DNS server. The mapping of host names allows users of the computing resources to easily locate computers on a network by remembering host names rather than numerical Internet Protocol (IP) addresses. The DNS server only stores two types of information, but a typical directory service stores virtually unlimited types of information.

The iDS is a general-purpose directory that stores all information in a single, network-accessible repository. The iDS provides a standard protocol and application programming interface (API) to access the information contained by the iDS.

The iDS provides global directory services, meaning that information is provided to a wide variety of applications. Until recently, many applications came bundled with a proprietary database. While a proprietary database can be convenient if only one application is used, multiple databases become an administrative burden if the databases manage the same information. For example, in a network that supports three different proprietary e-mail systems where each system has a proprietary directory service, if a user changes passwords in one directory, the changes are not automatically replicated in the other directories. Managing multiple instances of the same information results in increased hardware and personnel costs.

The global directory service provides a single, centralized repository of directory information that any application can access. However, giving a wide variety of applications access to the directory requires a network-based means of communicating between the numerous applications and the single directory. The iDS uses LDAP to give applications access to the global directory service.

LDAP is the Internet standard for directory lookups, just as the Simple Mail Transfer Protocol (SMTP) is the Internet standard for delivering e-mail and the Hypertext Transfer Protocol (HTTP) is the Internet standard for delivering documents. Technically, LDAP is defined as an on-the-wire bit protocol (similar to HTTP) that runs over Transmission Control Protocol/Internet Protocol (TCP/IP). LDAP creates a standard way for applications to request and manage directory information.

X.500 and X.400 are the corresponding Open Systems Interconnect (OSI) standards. LDAP supports a X.500 Directory Access Protocol (DAP) capabilities and can easily be embedded in lightweight applications (both client and server) such as email, web browsers, and groupware. LDAP originally enabled lightweight clients to communicate with X.500 directories. LDAP offers several advantages over DAP, including that LDAP runs on TCP/IP rather than the OSI stack, LDAP makes modest memory and CPU demands relative to DAP, and LDAP uses a lightweight string encoding to carry protocol data instead of the highly structured and costly X.500 data encodings.

An LDAP-compliant directory, such as the iDS, leverages a single, master directory that owns all user, group, and access control information. The directory is hierarchical, not relational, and is optimized for reading, reliability, and scalability. This directory becomes the specialized, central repository that contains information about objects and provides user, group, and access control information to all applications on the network. For example, the directory can be used to provide information technology managers with a list of all the hardware and software assets in a widely spanning enterprise. Most importantly, a directory server provides resources that all applications can use, and aids in the integration of these applications that have previously functioned as stand-alone systems. Instead of creating an account for each user in each system the user needs to access, a single directory entry is created for the user in the LDAP directory. FIG. 3 shows a portion of a typical directory with different entries corresponding to real-world objects. The directory depicts an organization entry (90) with the attribute type of domain component (dc), an organizational unit entry (92) with the attribute type of organizational unit (ou), a server application entry (94) with the attribute type of common name (cn), and a person entry (96) with the attribute type of user ID (uid). All entries are connected by the directory.

Understanding how LDAP works starts with a discussion of an LDAP protocol. The LDAP protocol is a message-oriented protocol. The client constructs an LDAP message containing a request and sends the message to the server. The server processes the request and sends a result, or results, back to the client as a series of LDAP messages. Referring to FIG. 4, when an LDAP client (100) searches the directory for a specific entry, the client (100) constructs an LDAP search request message and sends the message to the LDAP server (102) (step 104). The LDAP server (102) retrieves the entry from the database and sends the entry to the client (100) in an LDAP message (step 106). A result code is also returned to the client (100) in a separate LDAP message (step 108).

LDAP-compliant directory servers like the iDS have nine basic protocol operations, which can be divided into three categories. The first category is interrogation operations, which include search and compare operators. These interrogation operations allow questions to be asked of the directory. The LDAP search operation is used to search the directory for entries and retrieve individual directory entries. No separate LDAP read operation exists. The second category is update operations, which include add, delete, modify, and modify distinguished name (DN), i.e., rename, operators. A DN is a unique, unambiguous name of an entry in LDAP. These update operations allow the update of information in the directory. The third category is authentication and control operations, which include bind, unbind, and abandon operators.

The bind operator allows a client to identify itself to the directory by providing an identity and authentication credentials. The DN and a set of credentials are sent by the client to the directory. The server checks whether the credentials are correct for the given DN and, if the credentials are correct, notes that the client is authenticated as long as the connection remains open or until the client re-authenticates. The unbind operation allows a client to terminate a session. When the client issues an unbind operation, the server discards any authentication information associated with the client connection, terminates any outstanding LDAP operations, and disconnects from the client, thus closing the TCP connection. The abandon operation allows a client to indicate that the result of an operation previously submitted is no longer of interest. Upon receiving an abandon request, the server terminates processing of the operation that corresponds to the message ID.

In addition to the three main groups of operations, the LDAP protocol defines a framework for adding new operations to the protocol via LDAP extended operations. Extended operations allow the protocol to be extended in an orderly manner to meet new marketplace needs as they emerge.

A typical complete LDAP client/server exchange might proceed as depicted in FIG. 5. First, the LDAP client (100) opens a TCP connection to the LDAP server (102) and submits the bind operation (step 111). This bind operation includes the name of the directory entry that the client wants to authenticate as, along with the credentials to be used when authenticating. Credentials are often simple passwords, but they might also be digital certificates used to authenticate the client (100). After the directory has verified the bind credentials, the directory returns a success result to the client (100) (step 112). Then, the client (100) issues a search request (step 113). The LDAP server (102) processes this request, which results in two matching entries (steps 114 and 115). Next, the LDAP server (102) sends a result message (step 116). The client (100) then issues the unbind request (step 117), which indicates to the LDAP server (102) that the client (100) wants to disconnect. The LDAP server (102) obliges by closing the connection (step 118).

By combining a number of these simple LDAP operations, directory-enabled clients can perform useful, complex tasks. For example, an electronic mail client can look up mail recipients in a directory, and thereby, help a user address an e-mail message.

The basic unit of information in the LDAP directory is an entry, a collection of information about an object. Entries are composed of a set of attributes, each of which describes one particular trait of an object. Attributes are composed of an attribute type (e.g., common name (cn), surname (sn), etc.) and one or more values. FIG. 6 shows an exemplary entry (124) showing attribute types (120) and values (122). Attributes may have constraints that limit the type and length of data placed in attribute values (122). A directory schema places restrictions on the attribute types (120) that must be, or are allowed to be, contained in the entry (124).

SUMMARY OF INVENTION

In general, in one aspect, the invention involves a method of entry distribution that starts by receiving requests by a chaining backend from an original client. The requests are then forwarded from the chaining backend to a remote server. Results are returned from the remote server to the original client. The chaining backend is a type of database plug-in that acts as a multiplexer with limited persistent storage capabilities.

In one aspect, the invention is a directory server allowing entry distribution that comprises a chaining backend receiving a request from an original client. A remote server receives the request from the chaining backend and a result is returned to the original client from the remote server. The chaining backend is a type of database plug-in that acts as a multiplexer with limited persistent storage capabilities.

In one aspect, the invention is a directory server allowing entry distribution that comprises a means for supporting a plurality of backends, a means for supporting requests spanning over the plurality of backends, a means for supporting pluggable distribution logic, and a means for chaining the plurality of backends.

In one aspect, the invention is a system for entry distribution that comprises a means for receiving requests by a chaining backend from an original client, a means for forwarding requests from the chaining backend to a remote server, and a means for returning results from the remote server to the original client. The chaining backend is a type of database plug-in that acts as a multiplexer with limited persistent storage capabilities.

Other aspects and advantages of the invention will be apparent from the following description and the appended claims.

BRIEF DESCRIPTION OF DRAWINGS

FIG. 2 illustrates a block diagram of iPlanet™ Internet Service Development Platform.

FIG. 6 illustrates a directory entry showing attribute types and values.

DETAILED DESCRIPTION

Figure 1:
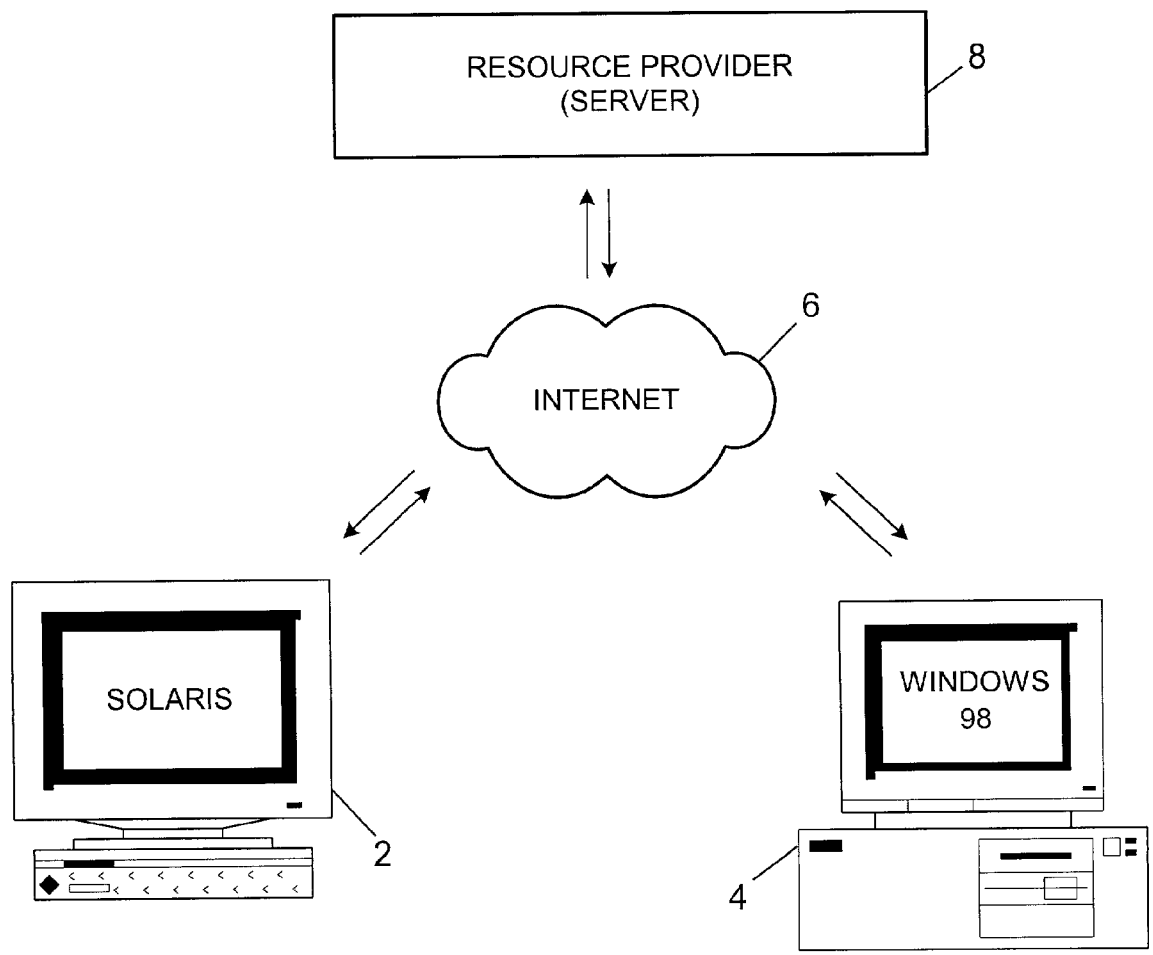
FIG. 1 illustrates a multiple platform environment.
Figure 3:
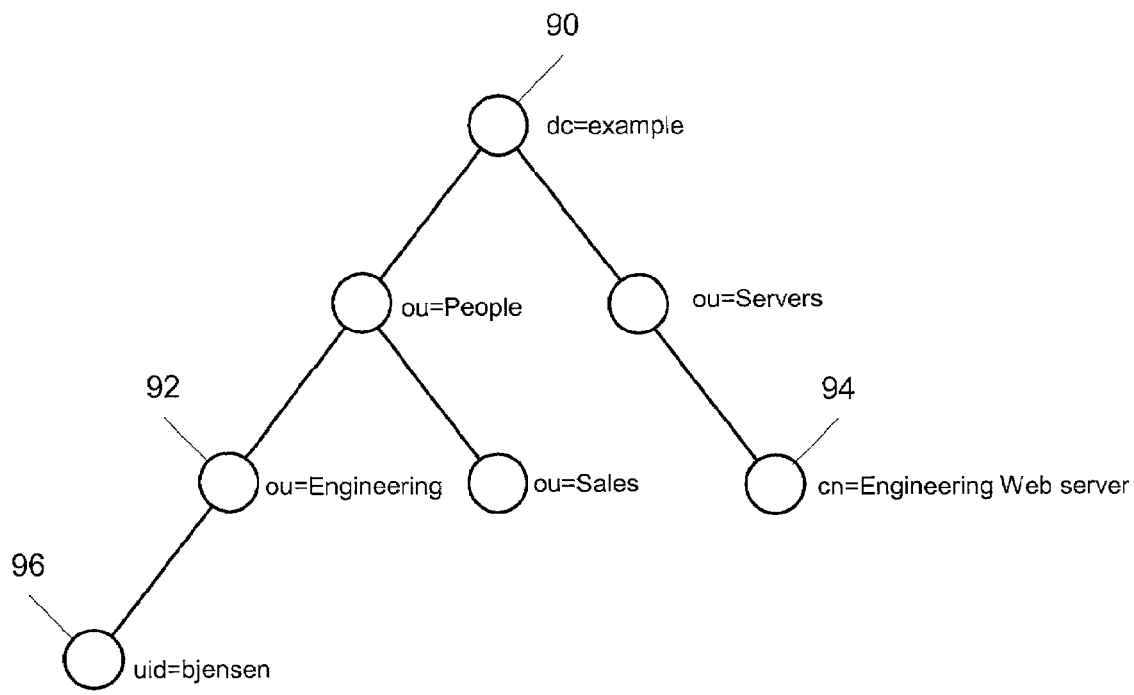
FIG. 3 illustrates part of a typical directory.
Figure 4:
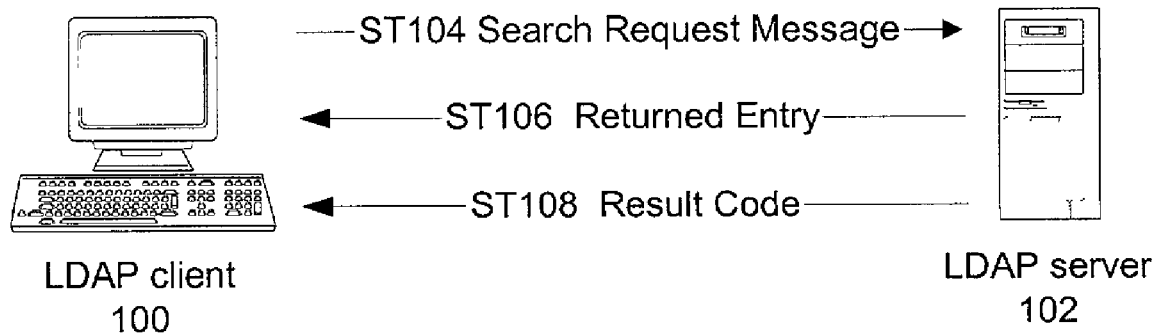
FIG. 4 illustrates the LDAP protocol used for a simple request.
Figure 5:
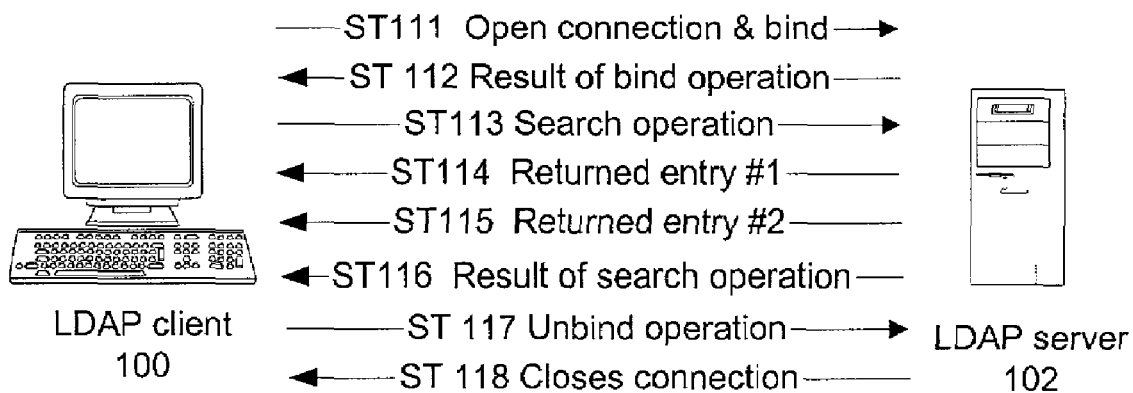
FIG. 5 illustrates a typical LDAP exchange between the LDAP client and LDAP server.

Specific embodiments of the invention will now be described in detail with reference to the accompanying figures. Like elements in the various figures are denoted by like reference numerals for consistency.

Figure 7:
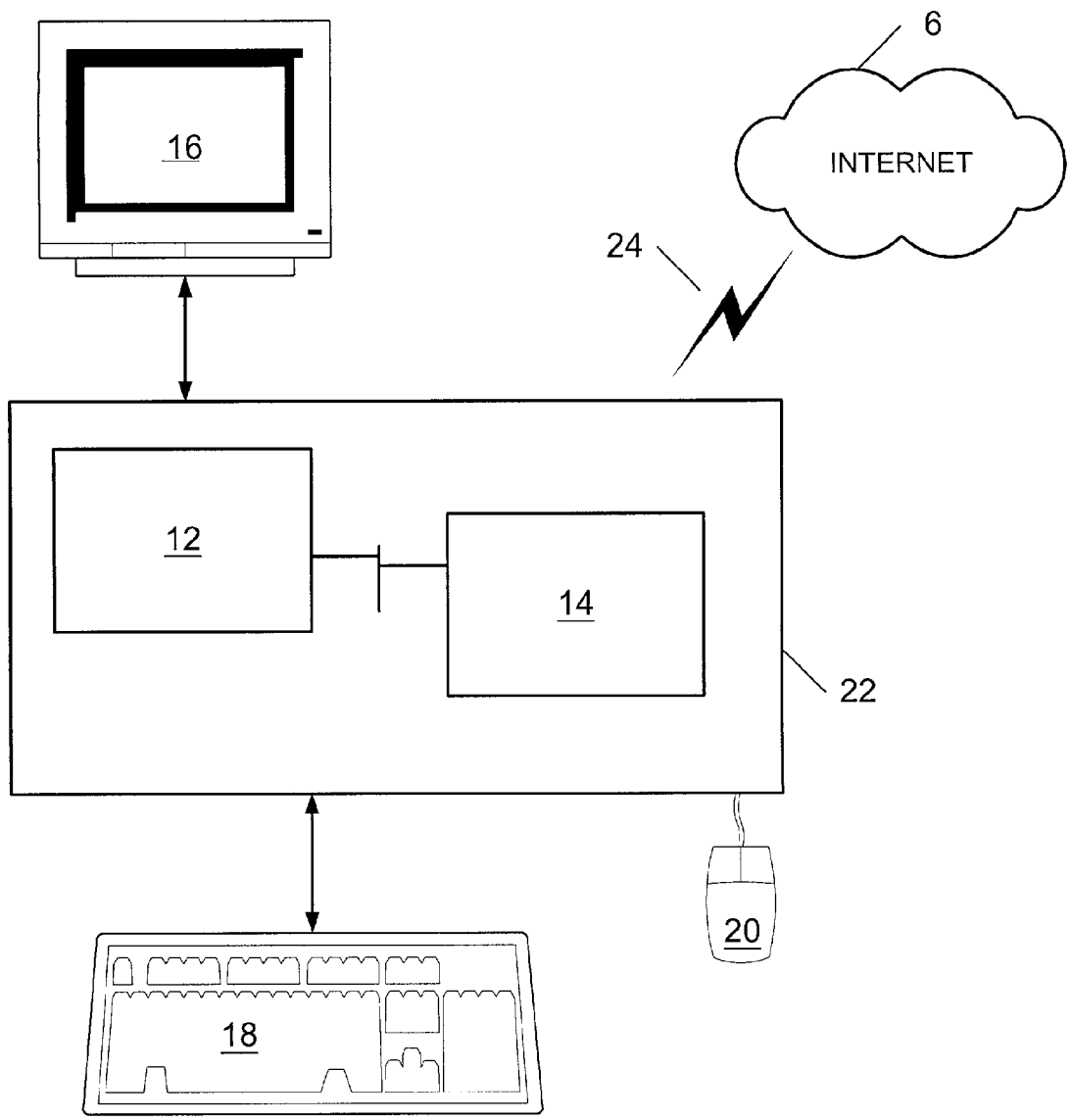
FIG. 7 illustrates a typical computer with components.

The invention described here may be implemented on virtually any type computer regardless of the traditional platform being used. For example, as shown in FIG. 7, a typical computer (22) has a processor (12), associated storage element (14), among others. The computer (22) has associated therewith input means such as a keyboard (18) and a mouse (20), although in an accessible environment these input means may take other forms. The computer (22) is also associated with an output device such as a display (16), which also may take a different form in a given accessible environment. Computer (22) is connected via a connection means (24) to the Internet (6).

Directory servers have been used as a corporate infrastructure component for over a decade. The directory server concept has evolved substantially over this time. Today, the directory industry roughly comprises three major categories: Network Operating Systems (NOS) Directories, Meta-directories, and Application Directories.

Figure 8:
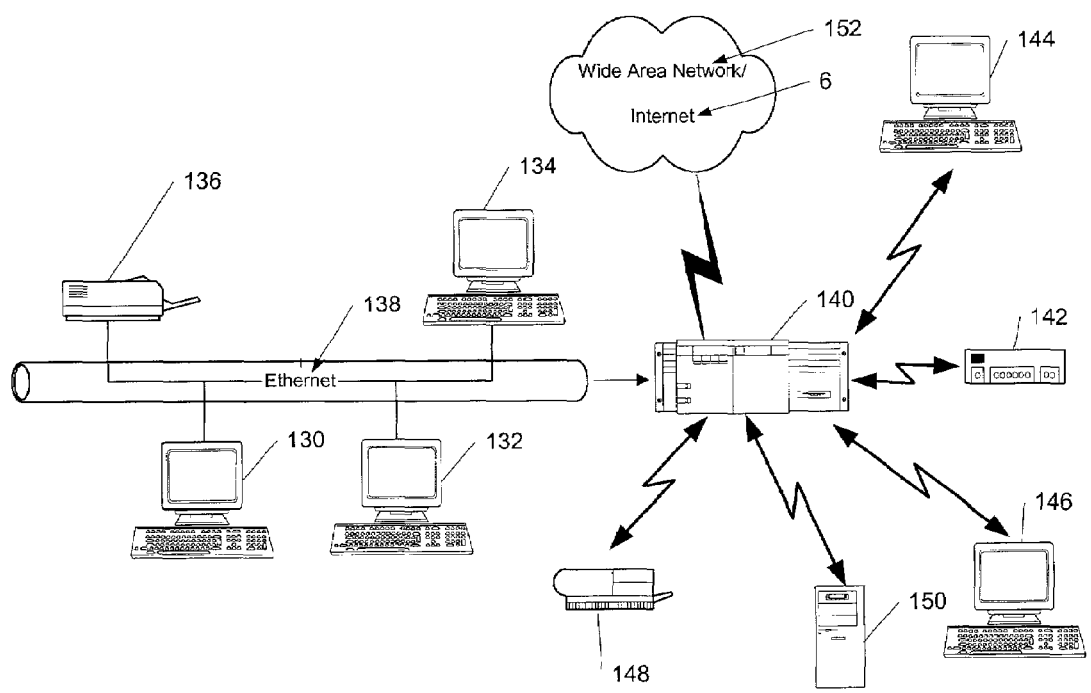
FIG. 8 illustrates a typical networked workgroup.

NOS directories are the oldest. These directories serve as information storage systems for the NOS. NOS directories are designed to support print-sharing and file-sharing requirements for small to medium-sized networked workgroups as shown in FIG. 8. The network workgroup shows a first client (130), a second client (132), a third client (134), and a shared printer (136) with an Ethernet connection (138) at one location. Using a router (140), a connection is made to a remote network via a hub (142). Connected to the hub (142) is a remote shared printer (148), a first remote client (144), a second remote client (146), and a file server (150). The entire networked workgroup is able to connect to a wide area network (152) or the Internet (6) via the router (140). NOS directories are also integrated with the operating system. Typical NOS directories include Microsoft® NT Domain Directory and Active Directory for Windows® 2000, Novell Directory Services (NDS), and Sun Microsystems Network Information Service (NIS) for UNIX.

The creation of Meta-directories is a result of the increase in requirement of the directory server from the explosion of e-mail communication. Meta-directories use standard protocols and proprietary connections for synchronizing e-mail systems. However, Meta-directories go beyond e-mail synchronization. Meta-directories integrate key legacy data-systems into a standards-based directory for use by one or more corporate Intranet applications.

Application directories store user information, such as employee, partner, vendor, and customer information, in a single repository for access by multiple applications across multiple heterogeneous systems for up to millions of users. Application directories provide storage for user information, user authentication and access control, and provide the foundation for security for many Internet applications. The primary purpose of the application directory is to support Intranet and E-commerce applications. Application directories serve this role by having such features as Meta-directory capabilities, high-performance, scalability and reliability.

iPlanet™ Directory Server (iDS) is a type of application directory that delivers user-management infrastructure for managing large volumes of user information for e-business applications and services. The iDS provides global directory services by providing information to a wide variety of applications. Until recently, many applications came bundled with their own proprietary databases. However, as discussed above, while a proprietary database can be convenient for a one application environment, multiple databases become an administrative burden if they manage the same information.

The global directory service provides a single, centralized repository of directory information that any application can access. However, giving a wide variety of applications access to the directory requires a network-based means of communicating between the applications and the directory. The iDS uses LDAP to give applications access to the global directory service.

With the increase of computer systems and networks, along with the data stored on them, the demand on directory servers has increased dramatically. Directory servers are now expected to support massive directories, with potentially tens of millions of entries. Thus, managing those entries efficiently is important. Entry distribution in a directory server environment is a feature that allows a directory database to be distributed across multiple directory servers. This feature allows the directory server to "scale up" to support massive directories.

The present invention involves entry distribution in a directory server. Entry distribution enables the deployment of a directory server mesh capable of storing at least tens of millions of entries. The directory performance is not degraded as a result of the function of the number of entries stored.

Four components of the iDS enable entry distribution, including multiple backends support, support for requests spanning over multiple backends, support for pluggable distribution methods, and a chaining backend. These four components can be used independently or, when used concurrently, allow entry distribution across a mesh of servers. Collectively, this is the LDAP multiplexer.

Figure 9:
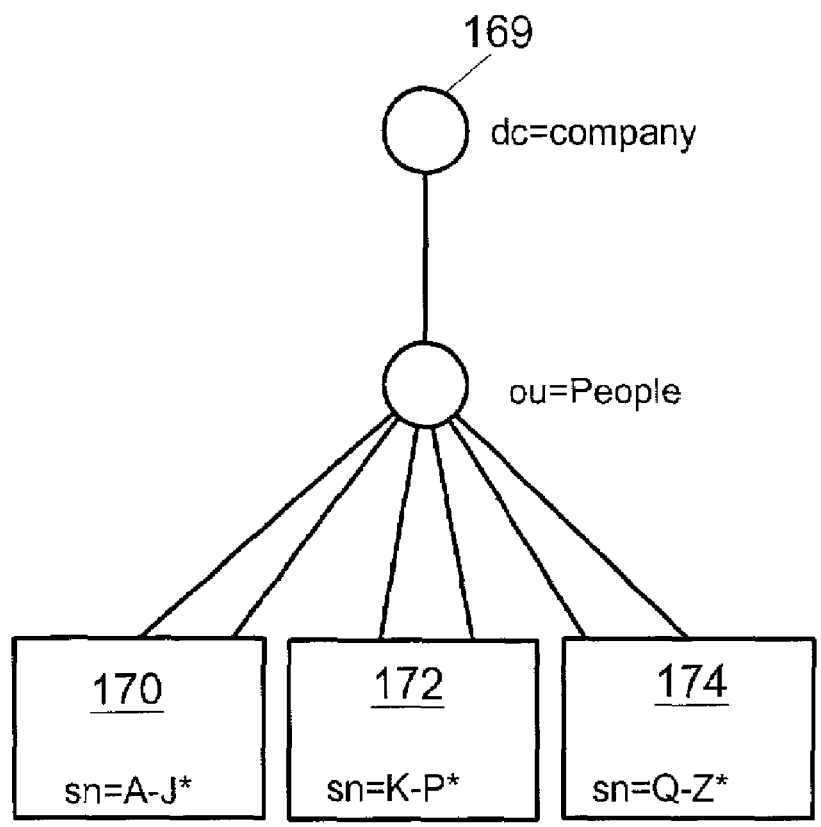
FIG. 9 illustrates a diagram of an entry distribution in one embodiment of the present invention.

A basic example of entry distribution in accordance with one or more embodiments of the present invention is illustrated in FIG. 9. In this example, a company that employs several thousand employees has a directory (169) with numerous entries. A directory administrator can choose to divide the entries alphabetically by last name. A first remote server (170) contains employee last names starting with the letter "A" to the letter "J." A second remote server (172) contains employee last names starting with letter "K" to letter "P." A third remote server (174) contains employee last names starting with letter "Q" to letter "Z." The chaining backend allows the data to be logically dispersed across the three remote servers while maintaining the location of the data. The distribution between the remote servers is extremely flexible and can be adjusted to any logical distribution chosen by the administrator (e.g., age, height, weight, first name, etc.). The flexibility is derived from the pluggable distribution logic.

The chaining backend is implemented in the iDS as a plug-in. Chaining of LDAP requests to other servers is supported by the iDS, as well as returning referrals (referrals are pieces of information returned by a server that tells a client which server to contact to fulfill a specific request). The iDS uses these plug-ins as a way to add functionality to the core server. Plug-ins have an enabled or disabled state. The plug-in may be enabled by default in one or more embodiments of the present invention.

Figure 10:
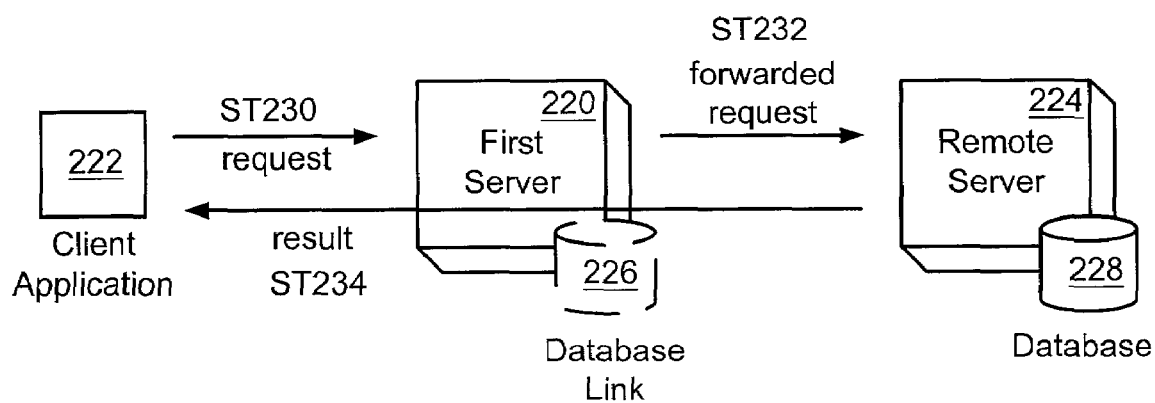
FIG. 10 illustrates a method of chaining to relay requests to another server implemented through a database link in one embodiment of the present invention.

The chaining backend acts as an LDAP multiplexer and has no (or very limited) persistent storage capabilities. An instance of chaining backend is associated with a single remote server. Requests received by the chaining backend from an original client are forwarded to the remote server and results are returned to the original client. Referring to FIG. 10, this method is implemented through a database link (226). The database link (226) contains no data. Instead, the link (226) redirects client application requests to remote servers that contain the required data. During chaining, a first server (220) receives a request (step 230) from a client application (222) for data not contained by the application (222). The first server then contacts a remote server (224) on behalf of the client application (222) (step 232) and returns the results to the client application (222) (step 234). Each database link (226) is associated to the remote server (224) holding data in a database (228). However, alternate remote servers can be configured to contain data replicas for the database link for use during a failover event, e.g., an overloaded or failed resource, such as a server is relocated to the alternate remote servers with little or no disruption to the users.

Figure 11:
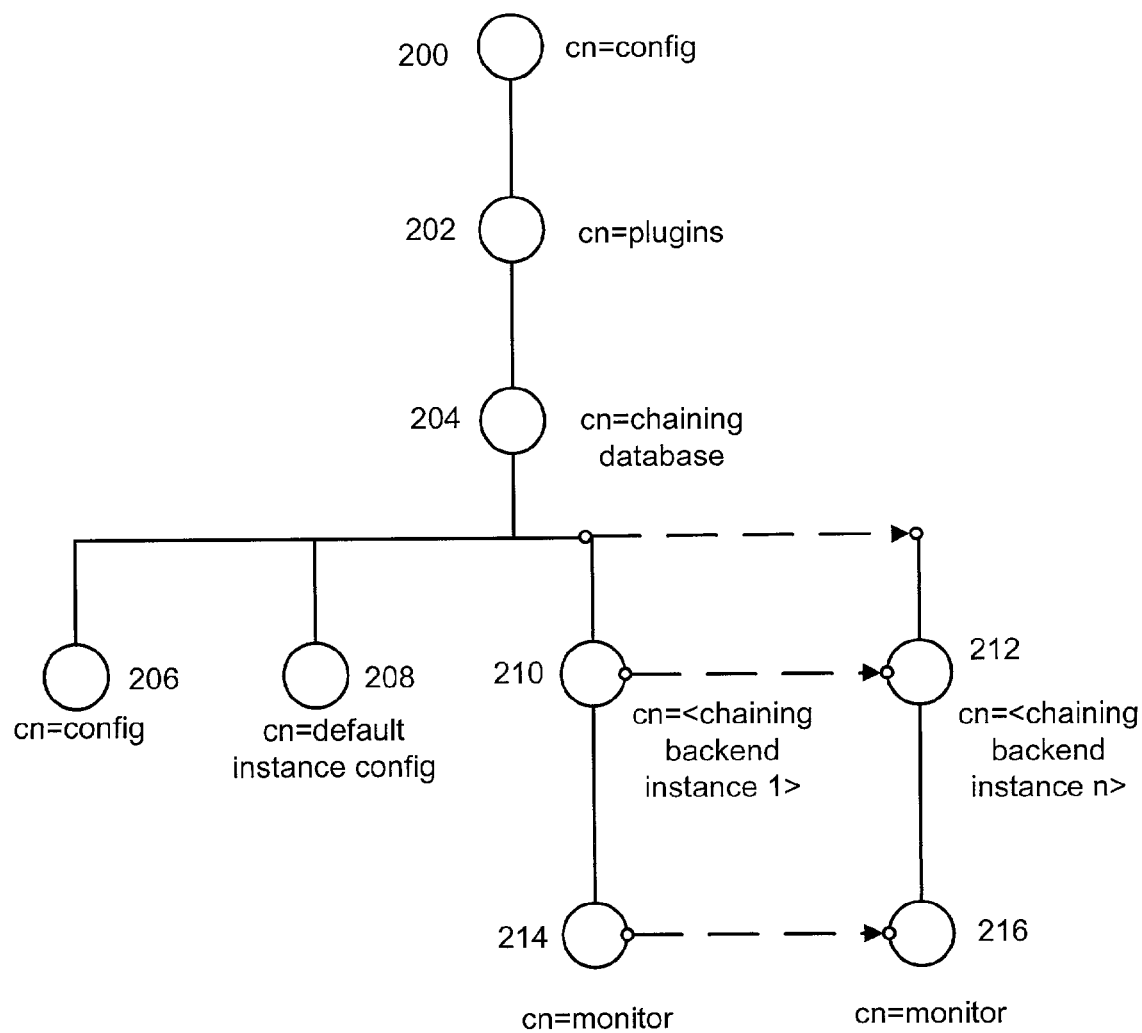
FIG. 11 illustrates a chaining backend instance configuration in Directory Information Tree layout in one embodiment of the present invention.

The chaining backend instance configuration is stored in LDAP as a Directory Information Tree (DIT). As shown in FIG. 11, a cn=config (200), a cn=chaining database (204), a cn=plugins (202), and a cn=config entry (206) contain configuration attributes globally shared by every chaining backend instance, e.g., control forwarding policy and chaining policy.

A cn=default instance config (208), the cn=chaining database (204), the cn=plugins (202), and the cn=config entry (206) contain default attribute values. The values of the cn=default instance config entry (208) are copied into a new cn=config entry (206) when a backend instance is created. This entry makes configuration easier for the directory administrator. This entry is automatically created with hard-coded default values, if missing.

There is one chaining backend instance entry (210) holding the configuration specific to each chaining backend instance. There can be multiple chaining backend instance entries (212), each of which must be a subordinate of the cn=chaining database entry (204). Monitoring attributes (e.g., counters, gauges) are stored in the cn=monitor entry (214 and 216) located below every respective chaining database instance entry (210 and 212). Monitoring attribute values are not persistent, i.e., counters are reset to zero whenever the iDS starts. No global monitoring node is associated with this backend type because monitoring is done per instance only.

Every standard LDAP operation is supported by the entry distribution method. Standard LDAP operations without any modifications are forwarded to the remote server when received by the chaining backend. Bind requests are chained to the remote server. An LDAP error code is returned that indicates whether a successful response is received from another server or not. In the face of "LDAP server down" or "LDAP connect failed" errors, up to a specified "tries" number of attempts are made to bind to the remote server. Attempts to bind to the remote server are retried without pause between attempts. The concern is to recover silently when the remote server is back up even though a decision had been made to close the connection. Both the maximum count of attempts and a bind timeout is configurable. Unbind operations are not chained to the remote server.

Figure 12:
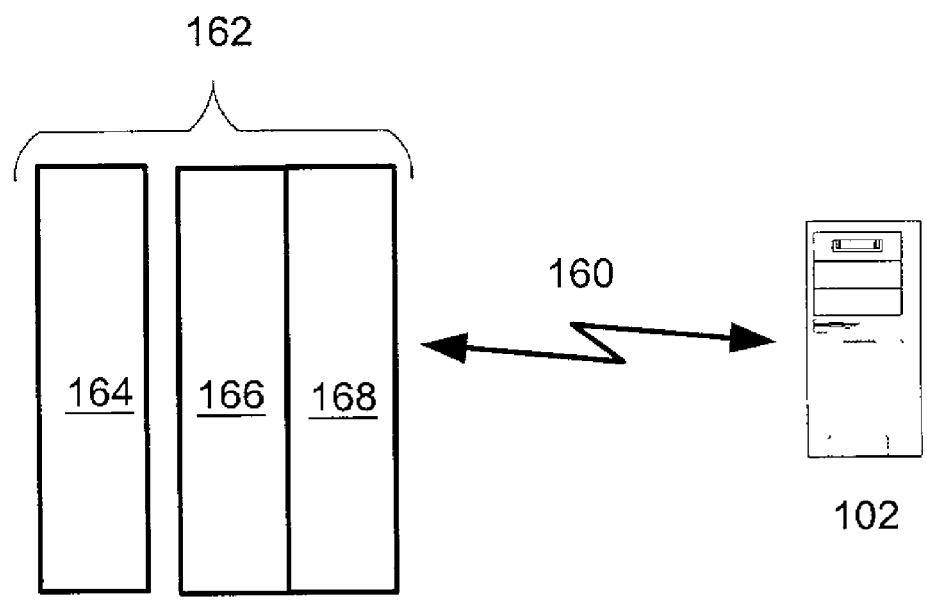
FIG. 12 illustrates an LDAP C API interface between an LDAP server and an LDAP application in one embodiment of the present invention.

The support of an abandon operation requires an LDAP C API to be used in asynchronous mode (that is, the calls are used to initiate a protocol operation to the server, and the ldap_result( ) call is used later to collect results from the previously initiated operations), in order to retrieve a message id (msg id). The LDAP C API defines a set of core functions that map almost one-to-one onto the LDAP protocol operations. As shown in FIG. 12, an LDAP server (102) using LDAP protocol (160) interfaces with a directory-enabled client application (162) made up of an LDAP application (164), LDAP C API (166), and an LDAP client library (168).

The chaining backend checks whether the operation is abandoned by examining the operation state using the plug-in API of the directory server. For single entry operations (every operation but one level or subtree-scoped searches), the operation state is checked when the operation result is received. For one-level or subtree-scoped search operations, the abandon operation is checked just before sending the search request, periodically (timeout in ldap_result( )) checked while processing search results, and checked when receiving a search entry/search result.

In one embodiment, the LDAP multiplexer may be configured so that a scoped search (one level or subtree) on a partitioned directory returns referrals that point to the remote servers holding entries instead of returning the entries directly. By default, entries are returned from the remote servers in accordance with one embodiment of the present invention.

A "search size limit" parameter is forwarded to the remote server. If search size exceeds the parameter of the search size limit, the result sent includes only the entries up to the search size limit forwarded to the remote server. A "time limit" parameter is re-evaluated immediately before sending the operation to the remote server in case the time limit has expired. The time limit is updated and forwarded to take into account the additional processing delay introduced by the LDAP multiplexer.

A persistent search control is not supported by the chaining backend. Virtual List View (vlv) and Server Side Sorting are supported only when a request is performed by a single back-end instance. A list of controls forwarded to the remote servers is configurable in the chaining backend instance configuration entry.

Internal search operations (those that are initiated by the iDS or a plug-in rather than by an LDAP client) are intended to return all attributes, including operational attributes. When an internal search operation is chained that has an attribute list set to null, all the defined operational attributes are explicitly requested so that all the attributes are returned by the remote server.

Entry distribution is hidden from the client point of view. The chaining backend coexists with other types of backends. Each instance of the chaining backend is linked to one remote server holding data, however the possibility exists to configure alternate remote servers holding copies of entries to which the chaining backend can failover.

Multiple servers are able to distribute data across the same set of directory nodes, where each node has a replica that can enable failover for a distributing directory. The LDAP multiplexer relies on the mechanisms provided by the freely available LDAP Software Development Kits (SDKs) (i.e., the possibility to specify multiple target hostnames in an ldap_init( ) initialization call).

In one or more embodiments of the present invention, a part of the directory can be added or removed from the system while the entire system remains operational from an application perspective. In order to accomplish this, the LDAP multiplexer temporarily returns referrals to the application until entries are redistributed across the directory according to the new distribution logic.

The chaining backend implements "pass-through authentication," i.e., forwarding the bind sequence to the appropriate remote server holding the user entry. Therefore, a trust relationship exists and needs to be configured between the LDAP multiplexer and the remote servers. Only simple bind and certificate-based authentication methods are supported by the LDAP multiplexer. Certificate-based authentication may be disabled by default. The directory administrator allows the chaining backend to fetch the user certificate from the remote server. Also, note that no end to end Secure Sockets Layer (SSL) connection between the client and remote server exists. However, it is possible to use SSL or Transport Layer Security (TLS) between the chaining backend and the remote server.

Access controls are always evaluated and enforced by the remote servers (the ones holding the entries). Access control allows specified clients to have access to particular information, while other clients do not have access, e.g., parts of the DIT that may be retrieved or modified. The iDS allows the user to perform functions or access files and directories based on the permissions granted to that user by a directory administrator. The Access Control List (ACL) contains a series of one or more access control information (ACI) statements that either allow or deny permissions (e.g., read, write, and search) and compare to specified entries and the attributes. Using the ACL, permissions can be set for the entire directory, a particular subtree of the directory, a specific entry in the directory, a specific set of entry attributes, or any entry that matches a given LDAP search filter. In addition, permissions may be set for a specific user, all users belonging to a specific group, or for all users of the directory. Lastly, access can be defined for a network location, e.g., an IP address or a DNS name.

User impersonation via the proxied authorization control is used to evaluate requests to the remote servers with the appropriate authorization identity. Appropriate ACLs exist on each remote server to support proxied authorization and to protect data from access to users whose entry is held by another server. A proxied authorization control is added to each request forwarded to the remote server to convey the identity of the user that has initiated the request. Optionally, SSL or TLS can be used between the LDAP multiplexer and the remote server to encrypt data. User impersonation on the remote servers can be disabled when access control evaluation does not need to be evaluated on a per user basis. The ACLs can be defined local to the chaining backend, for instance to prevent some user from using the chaining backend and wasting network bandwidth. The LDAP schema should remain consistent across servers participating in the entry distribution mesh. Replication of the distributed directory as a whole to another directory is not possible with the chaining backend, but each node may be replicated to provide failover capabilities within the distributed directory.

Directory management (e.g., start/stop, backup, etc.) is done at the level of the individual distribution or node directories. A set of command line tools is provided to rearrange entries across servers according to the distribution logic.

Connection management for entry distribution is different for bind connections. A specific pool of LDAP TCP connections is dedicated for the chaining of bind requests. Connection for all other operations is handled by each chaining backend maintaining a pool of connections to the remote server. The number of connections is configurable. Incoming LDAP requests are multiplexed over the connections where the connections are not dedicated to a specific LDAP operations. Each remote server is managed independently.

Multiple requests may be simultaneously issued on a single LDAP connection. Each server has a "maxconcurrency" configuration parameter that caps the number of outstanding operations per connection. For each connection, a reference count is maintained and used to track the number of threads using the connection. More than one connection may be opened to a server. Each remote server has a "maxconnections" configuration parameter associated with it that caps the number of connections. If no connection is able to service a request, threads go to sleep on a condition variable and another thread is awakened each time the connection reference count is decremented.

If an LDAP_CONNECT_ERROR or LDAP_SERVER_DOWN is error generated on a connection, the status is marked as "down" and the connection is closed as soon as all threads using the connection release the connection. Connections marked as "down" are not counted against the "maxconnections" limit.

Connections are closed and reopened when the connection has been open for more than the server's configured connection lifetime (if no lifetime is configured or is set to zero, the connections are never closed and reopened). The purpose of this action is to ensure that a reconnection to a primary server occurs after failover and recovery of the primary server. The connection management is stateless so there is no guarantee that operations from the same incoming client connections are sent to the same outgoing connection to the remote server.

Advantages of the present invention may include one or more of the following. With entry distribution, overall update throughput is greatly improved because the updates may be performed in parallel across a set of remote servers. Furthermore, the write throughput (add/modify/delete operations) is greatly improved by distributing entries across different servers.

Entry distribution is done at the entry level and not at the attribute level so a given entry cannot be split across multiple remote servers. However, entry distribution in a directory server allows the flexibility to physically divide a set of data between servers or on the same server. Entry distribution in a directory server does not follow fixed, rigid rules to govern how and when entries can be separated. Instead, the entries may be divided by any arbitrary function (e.g., alphabetically, country, region of a country, state, city, zip code, etc.) as chosen by a system administrator. This flexibility results in directory data that is logically partitioned across many servers. Also, entry distribution enables iDS to manage tens of millions of entries and thousands of queries per second.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of entry distribution, comprising:
   receiving requests by a chaining backend from an original client;
   forwarding requests from the chaining backend to one of a plurality of remote servers; and
   returning results from the one of the plurality of remote servers to the original client;
   wherein the chaining backend is a type of database plug-in that acts as a multiplexer,
   wherein the chaining backend comprises a directory information tree defining the hierarchy of the plurality of remote servers.

2. The method of claim 1, wherein standard LDAP operations are supported.

3. The method of claim 1, wherein the entry distribution is hidden from the original client.

4. The method of claim 1, wherein the chaining backend coexists with other backends.

5. The method of claim 1, further comprising:
   implementing pass-through authentication by the chaining backend.

6. The method of claim 1, further comprising:
   evaluating and enforcing access controls by the one of the plurality of remote servers that holds the results.

7. The method of claim 1, further comprising:
   evaluating and enforcing a plurality of access controls by the chaining backend.

8. The method of claim 1, further comprising:
   maintaining a pool of connections to the one of the plurality of remote servers by the chaining backend.

9. The method of claim 8, wherein the pool of connections for a bind connection is a specific pool of connections dedicated for chaining of bind requests.

10. The method of claim 1, further comprising:
    examining an operation state using the chaining backend to check whether an operation is abandoned.

11. The method of claim 1, further comprising:
    configuring the multiplexer to return a referral that point to the one of the plurality of remote servers holding the results.

12. The method of claim 1, further comprising:
    forwarding a search size limit parameter to the one of the plurality of remote servers.

13. The method of claim 1, further comprising:
    updating a time limit parameter to account for additional processing delay introduced by the multiplexer; and
    forwarding the updated time limit parameter to the one of the plurality of remote servers.

14. The method of claim 1, further comprising:
    implementing pass-through authentication by the chaining backend;
    evaluating and enforcing access controls by the one of the plurality of remote servers that holds the results;
    evaluating and enforcing a plurality of access controls by the chaining backend;
    maintaining a pool of connections to the one of the plurality of remote servers by the chaining backend;
    examining an operation state using the chaining backend to check whether an operation is abandoned;
    configuring the multiplexer to return a referral pointing to the one of the plurality of remote servers holding the results;
    forwarding a search size limit parameter to the one of the plurality of remote servers;
    updating a time limit parameter to account for additional processing delay introduced by the multiplexer; and forwarding the updated time limit parameter to the one of the plurality of remote servers.

15. A directory server allowing entry distribution, comprising:
   a chaining backend receiving a request from an original client, wherein the chaining backend is a type of database plug-in that acts as a multiplexer; and
   a plurality of remote servers operatively connected to the chaining backend, wherein the chaining backend forwards the request to one of the plurality of remote servers;
   wherein, a result obtained in response to the request is returned to the original client from the one of the plurality of remote servers,
   wherein the chaining backend comprises a directory information tree defining the hierarchy of the plurality of remote servers.

16. The directory server of claim 15, wherein standard LDAP operations are supported.

17. The directory server of claim 15, wherein the entry distribution is hidden from the original client.

18. The directory server of claim 15, wherein the chaining backend coexists with other backends.

19. The directory server of claim 15, further comprising:
   a pass-through authentication implemented by the chaining backend.

20. The directory server of claim 15, further comprising:
   a plurality of access controls evaluated and enforced by the one of the plurality of remote servers that holds the results.

21. The directory server of claim 15, further comprising:
   a plurality of access controls evaluated and enforced by the chaining backend.

22. The directory server of claim 15, further comprising:
   a pool of connections to the one of the plurality of remote servers maintained by the chaining backend.

23. The directory server of claim 22, wherein the pool of connections for a bind connection is a specific pool of connections dedicated for chaining of bind requests.

24. The directory server of claim 15, further comprising:
   an operation state examined using the chaining backend to check whether an operation is abandoned.

25. The directory server of claim 15, further comprising:
   the multiplexer configured to return a referral pointing to the one of the plurality of remote servers holding the results.

26. The directory server of claim 15, further comprising:
   a search size limit parameter forwarded to the one of the plurality of remote servers.

27. The directory server of claim 15, further comprising:
   a time limit parameter updated to account for additional processing delay introduced by the multiplexer; and
   an updated time limit parameter forwarded to the one of the plurality of remote servers.

28. The directory server of claim 15, further comprising:
   a pass-through authentication implemented by the chaining backend;
   a plurality of access controls evaluated and enforced by the one of the plurality of remote servers that holds the results;
   a plurality of access controls evaluated and enforced by the chaining backend;
   a pool of connections to the one of the plurality of remote servers maintained by the chaining backend;
   an operation state examined using the chaining backend to check whether an operation is abandoned;
   the multiplexer configured to return a referral pointing to the remote server holding the results;
   a search size limit parameter forwarded to the one of the plurality of remote servers;
   a time limit parameter updated to account for additional processing delay introduced by the multiplexer; and
   an updated time limit parameter forwarded to the one of the plurality of remote servers.

29. A system for entry distribution, comprising:
   means for receiving requests by a chaining backend from an original client;
   means for forwarding requests from the chaining backend to one of a plurality of remote servers; and
   means for returning results from the one of the plurality of remote servers to the original client;
   wherein the chaining backend is a type of database plug-in that acts as a multiplexer,
   wherein the chaining backend comprises a directory information tree defining the hierarchy of the plurality of remote servers.

* * * * *